US008785568B2

(12) United States Patent
Drysdale et al.

(10) Patent No.: US 8,785,568 B2
(45) Date of Patent: *Jul. 22, 2014

(54) POLYMER BLEND COMPRISING FLUORINATED BLOCK COPOLYESTER

(75) Inventors: Neville Everton Drysdale, Newark, DE (US); Elizabeth Forrester McCord, Hockessin, DE (US); Fredrik Nederberg, Greenville, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 174 days.

This patent is subject to a terminal disclaimer.

(21) Appl. No.: 13/291,656

(22) Filed: Nov. 8, 2011

(65) Prior Publication Data
US 2013/0116389 A1 May 9, 2013

(51) Int. Cl.
*C08G 63/127* (2006.01)
*C08G 63/00* (2006.01)
*C08G 63/02* (2006.01)
*C08F 283/00* (2006.01)
*C08F 283/01* (2006.01)
*C08L 67/03* (2006.01)

(52) U.S. Cl.
USPC ............. 525/444; 525/419; 525/437

(58) Field of Classification Search
CPC ..... C08L 67/02; C08L 87/005; C08G 63/127; C08G 63/181; C08G 63/183; C08G 63/682; C08G 63/6826
USPC ................. 525/418, 419, 437, 444
See application file for complete search history.

(56) References Cited

U.S. PATENT DOCUMENTS

| 6,531,558 | B1 * | 3/2003 | Shoichet et al. | 526/247 |
| 6,849,194 | B2 * | 2/2005 | Robin et al. | 252/8 |
| 8,304,513 | B2 * | 11/2012 | Drysdale et al. | 528/401 |
| 8,378,061 | B2 * | 2/2013 | Drysdale et al. | 528/401 |
| 2013/0116387 | A1 * | 5/2013 | Drysdale et al. | 525/444 |
| 2013/0116390 | A1 * | 5/2013 | Drysdale et al. | 525/444 |

FOREIGN PATENT DOCUMENTS

| JP | 62197419 A | * | 9/1987 |
| JP | 63034373 A | * | 2/1988 |
| JP | 03213398 A | * | 9/1991 |
| WO | WO 2011028771 A3 | * | 7/2011 |
| WO | WO 2011028778 A3 | * | 7/2011 |

OTHER PUBLICATIONS

EICSEARCH1 conducted Apr. 2, 2013.*
EICSEARCH2 conducted Apr. 17, 2013.*
EICSEARCH3 conducted Apr. 18, 2013.*
JP 63034373 partial translation.*
Related U.S. Appl. No. 13/291582, filed Nov. 8, 2011.
Related U.S. Appl. No. 13/291623, filed Nov. 8, 2011.
Related U.S. Appl. No. 13/291673, filed Nov. 8, 2011.
Related U.S. Appl. No. 12/873423, filed Sep. 1, 2010.
Related U.S. Appl. No. 12/873428, filed Sep. 1, 2010.
Related International Application, PCT International Application No. PCT/US2010/47492, Neville Everton Drysdale et al.), filed Sep. 1, 2010.
C. Carraher, Seymour/Carraher'S Polymer Chemistry, 5th Edition, Marcel Dekker Inc., New York and Basel (2003), Chapter 3, pp. 82-83.
T. Yokozawa et al., Chain-Growth Polycondensation for Well-Defined Condensation Polymers and Polymer Architecture, The Chemical Record, Vol. 5 (2005), pp. 47-57.
J. Deveaux, Transreactions in Condensation Polymers, Stoyko Fakirov, Editor, Wiley-VCH Gmbh (1999), Chapter 3, pp. 125-158.
J. Deveaux et al., Bisphenol-A Polycarbonate-Poly(Butylene Terephthalate) Transesterification. I. Theoretical Study of the Structure and of the Degree of Randomness in Four-Component Polycondensates, Journal of Polymer Science: Polymer Physics Edition, vol. 20 (1982), pp. 1875-1880.

* cited by examiner

*Primary Examiner* — Karuna P Reddy

(57) ABSTRACT

Disclosed are polymer blends prepared by melt blending a fluorinated block copolyester with a non-fluorinated polyester wherein the fluorinated block copolyester comprises blocks of fluoroether modified aromatic polyester and blocks of unmodified polyester. Suitable block copolyesters have a blockiness index, B, in the range of 0.25 to 1.0. Shaped articles prepared from the blends exhibit oil and soil resistance with high fluorine efficiency.

13 Claims, 3 Drawing Sheets

POLYMER BLEND COMPRISING FLUORINATED BLOCK COPOLYESTER

RELATED UNITED STATES PATENT APPLICATIONS

This application is related to co-pending U.S. patent application Ser. No. 13/291,582 submitted as on Nov. 8, 2011, entitled "Process For Preparing Fluorinated Block Copolyesters;" co-pending U.S. patent application Ser. No. 13/291,582 submitted as on Nov. 8, 2011, entitled "Fluorinated Block Copolyesters;" co-pending U.S. patent application Ser. No. 13/291,673 submitted as on Nov. 8, 2011, entitled "Shaped Articles Comprising a Fluorinated Block Copolyester;" co-pending U.S. patent application Ser. No. 12/873,423 entitled "Fluorovinylether Functionalized Aromatic Diesters And Derivatives Thereof, and Process for the Preparation Thereof," filed on Sep. 1, 2010; and, co-pending U.S. patent application Ser. No. 12/873,428 entitled "Polyesters Comprising Fluorovinylether Functionalized Aromatic Moieties," filed on Sep. 1, 2010.

FIELD OF THE INVENTION

The invention is directed to polymer blends prepared by melt blending a fluorinated block copolyester with a non-fluorinated polyester wherein the fluorinated block copolyester comprises blocks of fluoroether modified aromatic polyester and blocks of unmodified polyester. Shaped articles prepared from the blends exhibit oil and soil resistance with high fluorine efficiency.

BACKGROUND

Many polymers used in textile fiber applications, including apparel, bedding, and carpets and rugs, are known to exhibit susceptibility to staining. Polyesters and polyamides are known to exhibit staining from oily spills. The art discloses a number of surface treatment procedures and chemicals that have been employed over past decades to impart oil and soil repellency to polyester and polyamide fibers. Some of these treatments have been quite successful. However, all such treatments are subject to degradation from repeated wear—they tend to be gradually wiped off the surface in ordinary use. As a result, the well-known surface treatments used in the art tend to lose effectiveness over time, and require restoration. Restoration is a responsibility that devolves upon the consumer. Failure to regularly restore the surface treatment leads to premature deterioration of the appearance of the textile article to which it had been applied.

It is clear in the art that there is a need to provide oil and soil repellency of greater durability to polyester and polyamide textile goods.

Generally, oily substances cause staining in polyesters and polyamides because the oily substance wets the surface, and then diffuses into the interstices of the fibrous material. Soil repellency technologies have typically been directed to reducing the surface energy of the fibers to reduce the tendency of oils to wet the surface. It is well-known in the art that fluorinated chemicals are highly effective at reducing the surface energy of polyester and polyamide textile goods.

Fluorinated chemicals are also expensive, so it is highly desirable that as high a percentage as possible of the available fluorine atoms be caused to reside on the fiber surface, rather than within the body of the fiber where it does no good for soil repellency. In addition, the lower the concentration of additives in a polymer, the higher the property retention of the polymer itself. The higher the percentage of the fluorine atoms that reside on the surface of the fiber, the higher the so-called fluorine efficiency. A high fluorine efficiency is highly desirable.

Yokozawa et al. (Prog. Polym. Sci. 2007, 32, 147) disclose a so-called chain growth polycondensation process for the manufacturing of condensation polymers with defined molecular weights, molecular weight distributions and selective compositions.

WO2011/028778 discloses poly(alkylene arylate) copolymers comprising fluoroether functionalized alkylene arylate repeat units. Soil and water resistant fibers and fabrics prepared therefrom are disclosed.

Several block copolyesters or copolyether esters are in commercial use. Devaux et al., J. Poly Sci, Pol. Phys., 20, 1875 pp (1982); and, Devaux, Chapt. 3, *Transreactions in Condensation Polymers*, Fakirov, ed., John Wiley & Sons, DOI: 10.1002/9783527613847, Chapter 3.

SUMMARY OF THE INVENTION

In one aspect, the present invention provides a block copolymer having a blockiness index, B, in the range of 0.56 to 0.8, comprising a first block comprising a plurality of non-fluorinated alkylene arylate repeat units adjacent to one another; and a second block comprising a plurality of fluoroether functionalized alkylene arylate repeat units adjacent to one another; said non-fluorinated alkylene arylate repeat unit represented by Structure I

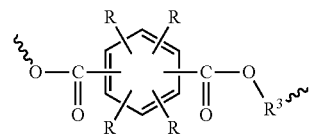

wherein each R is independently H or $C_1$-$C_{10}$ alkyl, and $R^3$ is $C_2$-$C_4$ alkylene which can be branched or unbranched; and, said fluoroether functionalized repeat units are represented by Structure II,

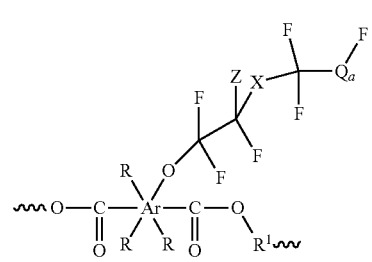

wherein Ar represents a benzene or naphthalene radical; each R is independently H, $C_1$-$C_{10}$ alkyl, $C_5$-$C_{15}$ aryl, $C_6$-$C_{20}$ arylalkyl; OH, or a radical represented by the Structure (III)

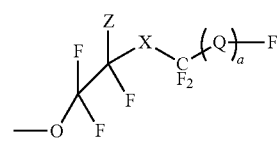

with the proviso that only one R can be OH or the radical represented by the Structure (III);
$R^1$ is a $C_2$-$C_4$ alkylene radical which can be branched or unbranched,
X is O or $CF_2$;
Z is H, Cl, or Br;
a=0 or 1;
and, Q represents the Structure (IIa)

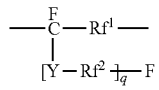

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

In another aspect, the invention provides a process comprising combining in the presence of a catalyst a non-fluorinated poly(alkylene arylate) first homopolymer and a fluoroether functionalized poly(alkylene arylate) second homopolymer to form a reaction mixture; heating said reaction mixture under vacuum to a temperature above the melting temperatures of each said homopolymer to prepare a liquified reaction mixture; and, agitating the liquified reaction mixture until the desired molecular weight is achieved.

In another aspect, the invention provides a polymer blend comprising a poly(alkylene arylate) and 0.1 to 10 weight percent based upon the total weight of the blend of a block copolymer having a blockiness index, B, in the range of 0.56 to 0.8, comprising a first block comprising a plurality of non-fluorinated alkylene arylate repeat units adjacent to one another; and a second block comprising a plurality of fluoroether functionalized alkylene arylate repeat units adjacent to one another; said non-fluorinated alkylene arylate repeat unit represented by Structure I

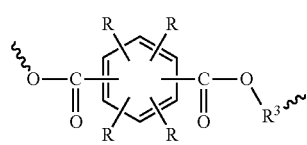

wherein each R is independently H or $C_1$-$C_{10}$ alkyl, and $R^3$ is $C_2$-$C_4$ alkylene which can be branched or unbranched;
and, said fluoroether functionalized repeat units are represented by Structure II,

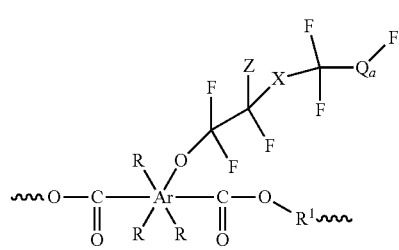

wherein, Ar represents a benzene or naphthalene radical; each R is independently H, $C_1$-$C_{10}$ alkyl, $C_5$-$C_{15}$ aryl, $C_6$-$C_{20}$ arylalkyl; OH, or a radical represented by the Structure (III)

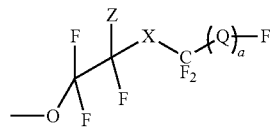

with the proviso that only one R can be OH or the radical represented by the Structure (III);
$R^1$ is a $C_2$-$C_4$ alkylene radical which can be branched or unbranched,
X is O or $CF_2$;
Z is H, Cl, or Br;
a=0 or 1;
and,
Q represents the Structure (IIa)

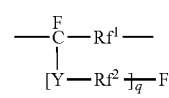

wherein q=0-10;
Y is 0 or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

DETAILED DESCRIPTION

Figure 1A:
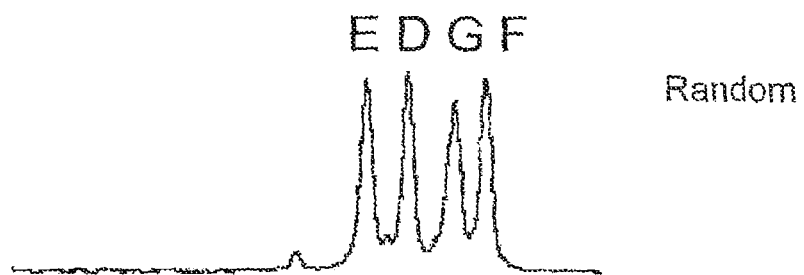
FIGS. 1A and 1B depict the NMR peaks from the ratios of which the blockiness index, B, of a copolymer is determined.

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

Molecular weight of the polyester polymers disclosed herein can be determined by any of a variety of methods. One such method commonly employed in the art of polyester polymers is the measurement of so-called intrinsic viscosity. The intrinsic viscosity of a polymer is determined by extrapolation of the measured solution viscosity of the polymer to zero concentration of polymer. The intrinsic viscosity so determined can then be related to the weight-average molecular weight ($M_w$) of the polymer by the Mark-Houwink equation, as described in *Polymer Chemistry*, Charles L. Carraher Jr., 5th edition, Marcel-Dekker (2000)

Another method for determining molecular weight is by so-called size-exclusion chromatography (SEC). A suitable method for performing SEC on the polymers is provided infra. SEC has the advantage of defining the entire molecular weight distribution, whereas intrinsic viscosity defines a single point on that distribution.

The parameters n, p, and q as employed herein are each independently integers in the range of 1-10.

As used herein, the term "copolymer" refers to a polymer comprising two or more chemically distinct repeat units in the polymer chain, including dipolymers, terpolymers, tetrapolymers and the like. The term "homopolymer" refers to a polymer wherein the repeat units in the polymer chain are chemically indistinguishable from one another (with the possible exception of the end groups). For the sake of brevity and clarity, the present disclosure is directed to copolymers comprising two chemically distinct repeat units. However, the same description can be readily extended to polymers having more than two chemically distinct repeat units. The copolymers disclosed herein preferably consist essentially of two chemically distinct repeat units.

In a copolymer comprising a first repeat unit and a second repeat unit, the term "block" in the phrase "block copolymer" refers to a sub-section of the copolymer chain in which a plurality of first repeat units are adjacent to one another rather than adjacent to second repeat units. In a copolymer formed by completely random combination of the two repeat units, there will result a certain number of blocks, of certain lengths of each repeat unit. The specific number of blocks and their length will depend upon the molar ratios of the repeat units, the relative reactivity of the repeat units, and other factors. A block copolymer is one in which the number and size of the blocks exceeds by a statistically significant amount that determined for a random copolymer of similar overall composition.

The blockiness index, B, is defined by Devaux, op. cit., as $$B = \frac{F_{12}}{2\sum\limits_{i=1}^{2} F_i}$$

wherein $F_{12}$ represents the total mole fraction of diads of first and second repeat units, in either sequence, and $F_i$ represents the mole fraction of repeat units of type "i" and the sum is taken over the two types of repeat units. For a 50/50 mol % composition of two polymer components B takes a value of 0 for a perfect block copolymer since $F_{12}=F_{21}\approx 0$, and a value of 1 for a random copolymer since $F_{12}=F_{21}\approx 0.25$, in both these cases $F_1=F_2\approx 0.5$.

$F_{12}$, $F_{21}$, $F_{11}$, and $F_{22}$ are the molar fractions of dyad repeat units in the polymer structure. The different dyads present in the copolymers:

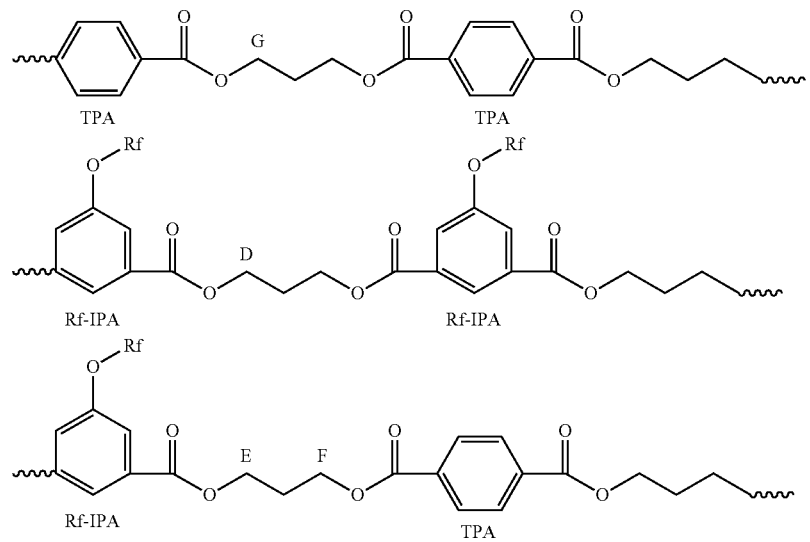

The designation "G" represents the NMR peak of the two OCH$_2$ carbons when two trimethylene terephthalate moieties are adjacent to one another; this dyad is designated TT; its mole fraction is $F_{11}$. The designation "D" represents the NMR peak of the two OCH$_2$ carbons when two 3-GF$_{16}$-iso (or two 3-GF$_{10}$-iso) moieties are adjacent to one another; this dyad is denoted FF; its mole fraction $F_{22}$. The designations "E" and "F" represent the two NMR peaks of the two different OCH$_2$ groups in the dyad which contains both a 3-GF$_{16}$-iso (or 3-GF$_{10}$-iso) moiety and a trimethylene terephthalate moiety. There are two statistically possible arrangements of this dyad, which are equivalent by NMR, designated FT and TF, with mole fractions $F_{12}$ and $F_{21}$. The relative amount of the TT dyad is determined by the area of peak G/2, of the FF dyad by the area of D/2, and of the sum FT and TF dyads by the area of (E+F)/2. These dyad amounts can be normalized to 100% to give the mole fraction of each type of dyad. Each of the dyad mole fractions is thus determined as follows:

$$F_i = \frac{\int X_i}{\sum\limits_{j=1-4} \int X_j}$$

In a random copolymer the statistical ratio of the dyad is 1:2:1 for TT:TF+FT:FF. In this case the areas of peaks D, E, F, G will be 1:1:1:1.

Figure 1B:
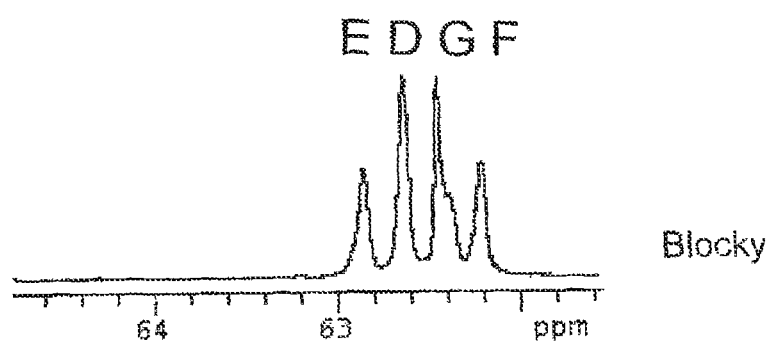

A representative NMR is shown in FIG. 1. A random copolymer and a blocky copolymer were prepared to have identical composition. A specimen of each was dissolved in deuterated trichloroethylene (TCE-d2), and the $^{13}$C NMR spectrum determined on a 700 MHz NMR. In the range of 63-62 ppm, four peaks were observed, designated respectively, E, D, G, F. The top set of peaks corresponded to the random copolymer. The bottom set of peaks corresponded to the blocky copolymer.

Referring again to FIG. 1, it is clear that in a random copolymer, the relative mole fraction of any one dyad is as probable as that of another. However, in the block copolymer, the mole fractions corresponding to the E and F dyads ($F_{12}$ and $F_{21}$) were reduced in favor of higher mole fractions corresponding to the D and G dyads ($F_{11}$ and $F_{22}$).

Figure 2:
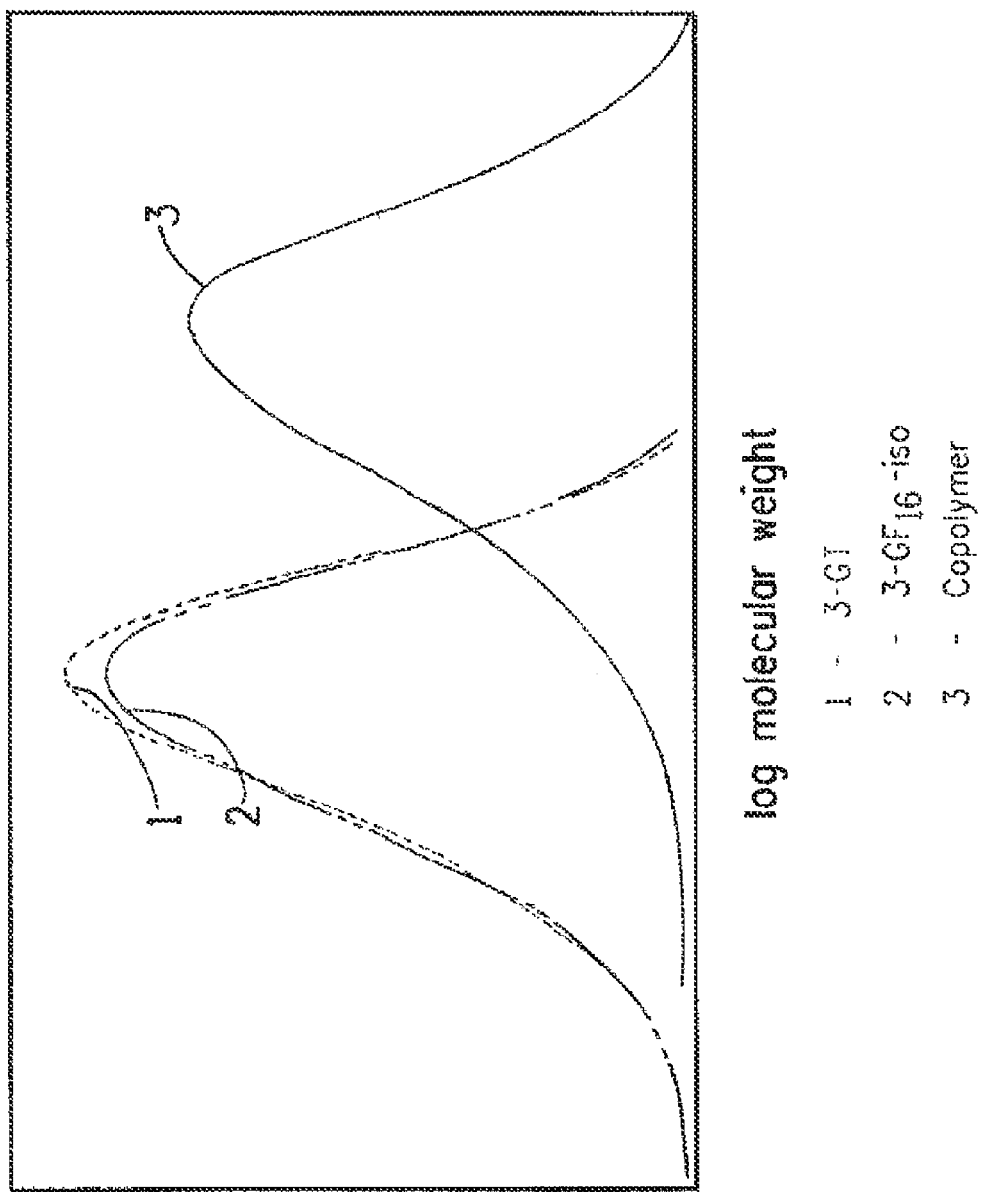
FIG. 2 depicts the molecular weight distributions of the two low molecular weight homopolymers from which a block copolymer according to the invention is prepared. The molecular weight distribution of the block copolymer is also shown.

Another way to characterize block copolymers is to compare the molecular weight distributions of the starting oligomeric or low molecular weight homopolymers with that of the final copolymer. FIG. 2 depicts results obtained from size exclusion chromatography employing the method described infra. In FIG. 2, curves 1 and 2 depict molecular weight distribution of fluorinated and non-fluorinated homopolymers having a $M_n$ of ca. 9,000 D. Curve 3 depicts the molecular weight distribution of the copolymer formed therefrom according to the process. The $M_n$ of the copolymer was ca. 60,000 D. All three distributions have a polydispersity ($M_w/M_n$) of ca. 2.0—the typical characteristic of a single condensation polymer population. Thus, the copolymer indicates that the two low molecular weight homopolymers fully reacted to form a single higher molecular weight polymer population, and that the copolymer is a multi-block copolymer.

A block copolymer also presents characteristic thermodynamic properties. Because of the blocky structure along the polymer chain, the block copolymer retains some of the features of the separate homopolymers that constitute the blocks. The block copolymer has two glass transition temperatures that are close to those of the separate homopolymeric components, and a melting point that corresponds to that of the non-fluorinated poly(alkylene arylate) homopolymer component. In contrast, a random copolymer of the same overall composition exhibits only one glass transition temperature that corresponds to neither of those of the separate components, and no melting point because the randomized presence of the fluorinated moiety along the polymer chain acts to disrupt the crystallization of the non-fluorinated component. The fluorinated homopolymer is fully amorphous, and doesn't exhibit a melting point.

In one aspect, the present invention provides a copolymer having a blockiness index, B, in the range of 0.56 to 0.8, comprising a first block comprising a plurality of non-fluorinated alkylene arylate repeat units adjacent to one another; and a second block comprising a plurality of fluoroether functionalized alkylene arylate repeat units adjacent to one another; said non-fluorinated alkylene arylate repeat unit represented by Structure I

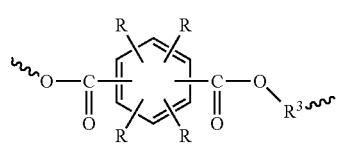

wherein each R is independently H or $C_1$-$C_{10}$ alkyl, and $R^3$ is $C_2$-$C_4$ alkylene which can be branched or unbranched; and, said fluoroether functionalized repeat units are represented by Structure II,

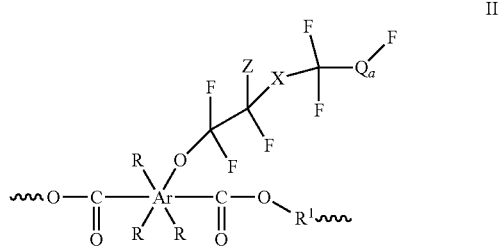

wherein, Ar represents a benzene or naphthalene radical; each R is independently H, $C_1$-$C_{10}$ alkyl, $C_5$-$C_{15}$ aryl, $C_6$-$C_{20}$ arylalkyl; OH, or a radical represented by the Structure (III)

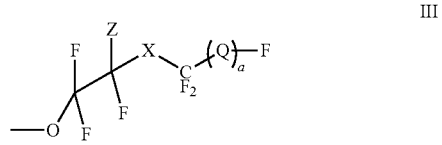

with the proviso that only one R can be OH or the radical represented by the Structure (III);
$R^1$ is a $C_2$-$C_4$ alkylene radical which can be branched or unbranched,
X is O or $CF_2$;
Z is H, Cl, or Br;
a=0 or 1;
and,
Q represents the Structure (IIa)

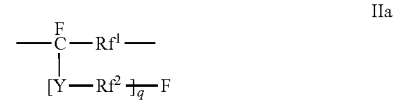

wherein q=0-10; Y is O or $CF_2$; $Rf^1$ is $(CF_2)_n$, wherein n is 0-10; and, $Rf^2$ is $(CF_2)_p$,
wherein p is 0-10, with the proviso that when p is 0, Y is $CF_2$.

As can be noted in the formulas above that show substituents attached to aromatic rings "Ar", the substituents can be attached to the aromatic rings at any point, thus making it possible to have ortho-, meta- and para-substituents as defined above.

There is no particular limitation on the relative amount of the fluoroether functionalized repeat units and non-fluorinated repeat units. The desired amounts will be determined by considerations peculiar to the intended use. In one embodiment of the copolymer, the mole ratio of non-fluorinated repeat units to fluoroether functionalized repeat units is in the range of 9 to 0.25. In a further embodiment, the mole ratio is in the range of 1.5 to 0.67.

In one embodiment of the polymer, each R is H.
In one embodiment of the fluoroether functionalized alkylene arylate repeat unit, one R is represented by the Structure (II) and the remaining two Rs are each H.
In one embodiment, $R^1$ is an ethylene radical.
In one embodiment, $R^1$ is a trimethylene radical, which can be branched.
In one embodiment, $R^1$ is a tetramethylene radical, which can be branched.

In one embodiment, X is O. In an alternative embodiment, X is $CF_2$.
In one embodiment, Y is O. In an alternative embodiment, Y is $CF_2$.
In one embodiment, $Rf^1$ is $CF_2$.
In one embodiment, $Rf^2$ is $CF_2$.
In one embodiment, $Rf^2$ is a bond (that is, p=0), and Y is $CF_2$.
In one embodiment, a=0.
In one embodiment, a=1, q=0, and n=0.
In one embodiment of the fluoroether functionalized alkylene arylate repeat unit, Ar is a benzene radical, a=1, each R is H, Z is H, $R^1$ is trimethylene, X is O, Y is O, $Rf^1$ is $CF_2$, and $Rf^2$ is perfluoropropenyl, and q=1.
In one embodiment the specific repeat unit represented by Structure (I) is represented by the Structure (IVa)

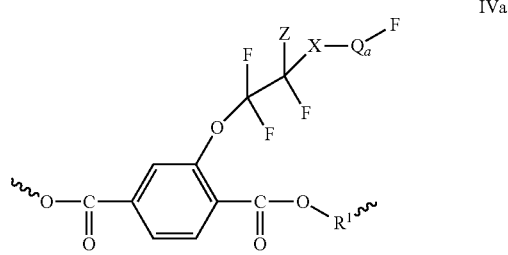

IVa wherein $R^1$, Z, X, Q, and a are as stated supra.
In an alternative embodiment the specific repeat unit represented by Structure (I) is represented by the Structure (IVb)

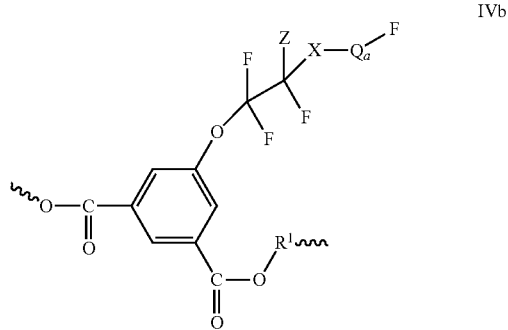

IVb wherein $R^1$, Z, X, Q, and a are as stated supra.
In one embodiment the non-fluorinated alkylene arylate repeat unit comprising arylate repeat unit is represented by the Structure (V),

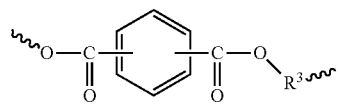

V wherein $R^3$ is $C_2$-$C_4$ alkylene which can be branched or unbranched. In one embodiment, $R^3$ is trimethylene. In one embodiment, the repeat unit represented by Structure (V) is a $C_2$-$C_4$ alkylene terephthalate radical, especially a trimethylene terephthalate radical. In an alternative embodiment, the repeat unit represented by Structure (V) is a $C_2$-$C_4$ alkylene isophthalate radical, especially a trimethylene terephthalate radical.

The molecular weight of the final copolymer varies depending on the overall condensation time. Typically a longer overall reaction time leads to higher overall molecular weight assuming adequate vacuum and stirring conditions can be maintained. In general, molecular weight number averages ($M_n$) between 20,000 Da (Intrinsic viscosity I.V.<0.4 dL/g) to 100,000 Da (I.V.=0.73 dL/g) was reached.

In one embodiment of the copolymer, the mole ratio of non-fluorinated repeat units to fluoroether functionalized repeat units is in the range of 9 to 0.25. In a further embodiment, the mole ratio is in the range of 1.5 to 0.67.

In another aspect, the invention provides a process comprising combining in the presence of a catalyst a non-fluorinated poly(alkylene arylate) first homopolymer and a fluoroether functionalized poly(alkylene arylate) second homopolymer to form a reaction mixture; heating said reaction mixture under vacuum to a temperature above the melting temperatures of each said homopolymer to prepare a molten reaction mixture; and, agitating the molten reaction mixture until the desired molecular weight is achieved.

In one embodiment, the fluoroether-functionalized poly(alkylene arylate) is an oligomer having a number average molecular weight in the range of 5,000 to 15,000 Da.

In one embodiment, both the non-fluorinated poly(alkylene arylate) homopolymer and the fluoroether-functionalized poly(alkylene arylate) homopolymer are oligomers having a number average molecular weight in the range of 5,000 to 15,000 D.

It has now been found that little transesterification occurs in the melt between the fluoroether functionalized homopolymer and the non-fluorinated homopolymer. Condensation reactions occur at end groups of the melt-mixed polymers in the presence of a suitable catalyst. The internal structure of the homopolymer chains remains substantially intact. The product of the reaction is the block copolymer.

The number and size of the blocks in the polymer chain will depend upon the molecular weight of each of the starting homopolymers. High molecular weight homopolymer starting materials will lead to copolymers having a relatively small number of relatively large blocks, and reaction rate is relatively slow. The molecular weight of the resulting polymer could be undesirably high for many applications. Low molecular weight homopolymer starting materials result in copolymers with more but relatively shorter blocks. The resulting copolymers may exhibit undesirably low molecular weight. The molecular weight of the copolymer can be increased by increasing the reaction time, but longer reaction time also results in more transesterification and greater randomization.

Any non-fluorinated poly(alkylene arylate) homopolymer such as is known in the art is suitable for use as the non-fluorinated poly(alkylene arylate) homopolymer in the processes disclosed herein. Suitable non-fluorinated poy(alkylene arylate) homopolymers include, but are not limited to, poly(ethylene terephthalate) homopolymer, poly(trimethylene terephthalate) homopolymer, and poly(tetramethylene terephthalate) homopolymer. Suitable non-fluorinated poly(alkylene arylate) homopolymers have a molecular weight, as measured by intrinsic viscosity (I.V.) in the range of 0.1-1.1 dL/g. with 0.3-0.4 dL/g preferred. Suitable non-fluorinated poly(alkylene arylates) can be purchased from commercial sources, or produced in a laboratory setup to reach molecular weights outside the commercial range. An aromatic polyester homopolymer is prepared by mixing dimethylterephthalate or terephthalic acid with an excess of $C_2$-$C_4$ alkylene glycol or a mixture thereof, branched or unbranched, and a catalyst to form a reaction mixture. The reaction can be conducted in the melt, preferably within the temperature range of 180 to 240° C., to initially condense either methanol or water, after which the mixture can be further heated, preferably to a temperature within the range of 230 to 300° C., and evacuated, to remove the excess $C_2$-$C_4$ glycol and thereby form a homopolymer Suitable catalysts include but are not limited to titanium (IV) butoxide, titanium (IV) isopropoxide, antimony trioxide, antimony triglycolate, sodium acetate, manganese acetate, and dibutyl tin oxide. The selection of catalysts is based on the degree of reactivity associated with the selected glycol. For example, it is known that 1,3-propanediol is considerably less reactive than is 1,2-ethanediol. Titanium butoxide and dibutyl tin oxide—both considered "hot" catalysts—have been found to be suitable for process when 1,3-propanediol is employed, but are considered over-active for the process when 1,2-ethanediol.

The reaction can be carried out in the melt. The resulting polymer can be separated by vacuum distillation to remove the excess of $C_2$-$C_4$ glycol.

Preparation of a suitable fluoroether functionalized poly (alkylene arylate) homopolymer is described in WO2011/028778. A fluoroether functionalized aromatic diester or diacid is combined with an excess of $C_2$-$C_4$ alkylene glycol or a mixture thereof, branched or unbranched, and a catalyst to form a reaction mixture. The reaction can be conducted in the melt, preferably within the temperature range of 180 to 240° C., to initially condense either methanol or water, after which the mixture can be further heated, preferably to a temperature within the range of 210 to 300° C., and evacuated, to remove the excess $C_2$-$C_4$ glycol and thereby form a homopolymer comprising repeat units having the Structure (II), wherein the fluoroether functionalized aromatic diester or diacid is represented by the Structure (V),

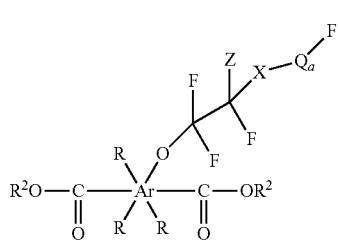

V wherein, Ar represents a benzene or naphthalene radical; each R is independently H, $C_1$-$C_{10}$ alkyl, $C_5$-$C_{15}$ aryl, $C_6$-$C_{20}$ arylalkyl; OH, or a radical represented by the Structure (III)

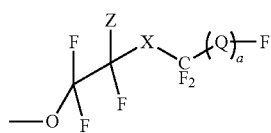

III with the proviso that only one R can be OH or the radical represented by the Structure (III); $R^2$ is H or $C_1$-$C_{10}$ alkyl; X is O or $CF_2$; Z is H, Cl, or Br; a=0 or 1; and, Q represents the Structure (IIa)

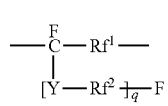

IIa wherein q=0-10; Y is O or $CF_2$; $Rf^1$ is $(CF_2)_n$, wherein n is 0-10; and, $Rf^2$ is $(CF_2)_p$, wherein p is 0-10, with the proviso that when p is 0, Y is $CF_2$.

In some embodiments, the reaction is carried out at about the reflux temperature of the reaction mixture.

In one embodiment of the process, one R is OH.

In one embodiment of the process, each R is H.

In one embodiment of the process, one R is OH and the remaining two Rs are each H.

In one embodiment of the process, one R is represented by the Structure (II) and the remaining two $R^5$ are each H.

In one embodiment of the process, $R^2$ is H.

In one embodiment of the process, $R^2$ is methyl.

In one embodiment of the process, X is O. In an alternative embodiment, X is $CF_2$.

In one embodiment of the process, Y is O. In an alternative embodiment, Y is $CF_2$.

In one embodiment of the process, $Rf^1$ is $CF_2$.

In one embodiment of the process, $Rf^2$ is $CF_2$.

In one embodiment of the process, $Rf^2$ is a bond (that is, p=0), and Y is $CF_2$.

In one embodiment, a=0.

In one embodiment, a=1, q=0, and n=0.

In one embodiment of the process, each R is H, Z is Cl, R2 is methyl, X is O, Y is O, Rf1 is CF2, and Rf2 is perfluoropropenyl, and q=1.

Suitable alkylene glycols include but are not limited to 1,2-ethanediol, 1,3-propanediol, 1,4-butanediol, and mixtures thereof. In one embodiment, the alkylene glycol is 1,3-propanediol.

Suitable catalysts include but are not limited to titanium (IV) butoxide, titanium (IV) isopropoxide, antimony trioxide, antimony triglycolate, sodium acetate, manganese acetate, and dibutyl tin oxide. The selection of catalysts is based on the degree of reactivity associated with the selected glycol. For example, it is known that 1,3-propanediol is considerably less reactive than is 1,2-ethanediol. Titanium butoxide and dibutyl tin oxide—both considered "hot" catalysts—have been found to be suitable for process when 1,3-propanediol is employed, but are considered over-active for the process when 1,2-ethanediol.

The reaction can be carried out in the melt. The thus resulting polymer can be separated by vacuum distillation to remove the excess of $C_2$-$C_4$ glycol.

Suitable fluoroether functionalized aromatic diesters can be prepared by forming a reaction mixture comprising a hydroxy aromatic diester in the presence of a solvent and a catalyst with a perfluoro vinyl compound represented by the Structure (VI)

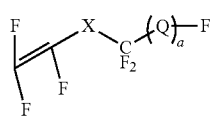

VI wherein X is O or $CF_2$, a=0 or 1; and, Q represents the Structure (IIa)

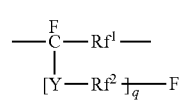

IIa wherein q=0-10; Y is O or CF$_2$; Rf1 is (CF$_2$)$_n$, wherein n is 0-10; Rf$^2$ is (CF$_2$)$_p$, wherein p is 0-10, with the proviso that when p is 0, Y is CF$_2$;
under agitation at a temperature between about −70° C. and the reflux temperature of the reaction mixture. The reaction mixture is cooled following reaction.

When a halogenated solvent is employed, the group indicated as "Z" in the resulting fluoroether aromatic diester represented by Structure (V) is the corresponding halogen. Suitable halogenated solvents include but are not limited to tetrachloromethane, tetrabromomethane, hexachloroethane and hexabromoethane. If the solvent is non-halogenated Z is H. Suitable non-halogenated solvents include but are not limited to tetrahydrofuran (THF), dioxane, and dimethylformamide (DMF).

The reaction is catalyzed by a base. A variety of basic catalysts can be used, i.e., any catalyst that is capable of deprotonating phenol. That is, a suitable catalyst is any catalyst having a pKa greater than that of phenol (9.95, using water at 25° C. as reference). Suitable catalysts include, but are not limited to, sodium methoxide, calcium hydride, sodium metal, potassium methoxide, potassium t-butoxide, potassium carbonate or sodium carbonate. Preferred are potassium t-butoxide, potassium carbonate, or sodium carbonate.

Reaction can be terminated at any desirable point by the addition of acid (such as, but not limited to, 10% HCl). Alternatively, when using solid catalysts, such as the carbonate catalysts, the reaction mixture can be filtered to remove the catalyst, thereby terminating the reaction.

Suitable hydroxy aromatic diesters include, but are not limited to, 1,4-dimethyl-2-hydroxy terephthalate, 1,4-diethyl-2-5-dihydroxy terephthalate, 1,3-dimethyl 4-hydroxyisophthalate, 1,3-dimethyl-5-hydroxy isophthalate, 1,3-dimethyl 2-hydroxyisophthalate, 1,3-dimethyl 2,5-dihydroxyisophthalate, 1,3-dimethyl 2,4-dihydroxyisophthalate, dimethyl 3-hydroxyphthalate, dimethyl 4-hydroxyphthalate, dimethyl 3,4-dihydroxyphthalate, dimethyl 4,5-dihydroxyphthalate, dimethyl 3,6-dihydroxyphthalate, dimethyl 4,8-dihydroxynaphthalene-1,5-dicarboxylate, dimethyl 3,7-dihydroxynaphthalene-1,5-dicarboxylate, dimethyl 2,6-dihydroxynaphthalene-1,5-dicarboxylate, or mixtures thereof.

Suitable perfluorovinyl compounds include, but are not limited to, 1,1,1,2,2,3,3-heptafluoro-3-(1,1,1,2,3,3-hexafluoro-3-(1,2,2-trifluorovinyloxy)propan-2-yloxy)propane, heptafluoropropyltrifluorovinylether, perfluoropent-1-ene, perfluorohex-1-ene, perfluorohept-1-ene, perfluorooct-1-ene, perfluoronon-1-ene, perfluorodec-1-ene, and mixtures thereof.

To prepare a suitable fluoroether functionalized aromatic diester a suitable hydroxy aromatic diester and a suitable perfluovinyl compound are combined in the presence of a suitable solvent and a suitable catalyst until the reaction has achieved the desired degree of conversion. The reaction can be continued until no further product is produced over some preselected time scale. The required reaction time to achieve the desired degree of conversion depends upon the reaction temperature, the chemical reactivity of the specific reaction mixture components, and the degree of mixing applied to the reaction mixture. Progress of the reaction can be monitored using any one of a variety of established analytical methods, including, but not limited to, nuclear magnetic resonance spectroscopy, thin layer chromatography, and gas chromatography.

When the desired level of conversion has been achieved, the reaction mixture is quenched, as described supra. The thus quenched reaction mixture can be concentrated under vacuum, and rinsed with a solvent. Under some circumstances, a plurality of compounds encompassed by the Structure (V) can be made in a single reaction mixture. In such cases, separation of the products thus produced can be effected by any method known to the skilled artisan such as, but not limited to, distillation or column chromatography.

If it is desired to employ the corresponding diacid instead of the diester, the thus produced fluoroether functionalized aromatic diester can be contacted with an aqueous base, preferably a strong base such as KOH or NaOH, at a gentle reflux, followed by cooling to room temperature, followed by acidifying the mixture, preferably with a strong acid, such as HCl or H$_2$SO$_4$, until the pH is between 0 and 2. Preferably pH is 1. The acidification thus performed causes the precipitation of the fluoroether functionalized aromatic diacid. The thus precipitated diacid can then be isolated via filtration and recrystallization from suitable solvents (e.g., redissolved in a solvent such as ethyl acetate, and then recrystallized). The progress of the reaction can be followed by any convenient method, including but not limited to thin layer chromatography, gas chromatography and NMR.

Once the fluoroether functionalized aromatic compound has been thus prepared, it is suitable for use in preparation of the fluoroether functionalized homopolymer for use in the processes disclosed herein, among other potential uses.

In another aspect, the invention provides a polymer blend comprising a poly(alkylene arylate) and 0.1 to 10 weight percent, preferably 0.5-5%, based upon the total weight of the blend of a block copolymer having a blockiness index, B, in the range of 0.56 to 0.8, comprising a first block comprising a plurality of non-fluorinated alkylene arylate repeat units adjacent to one another; and a second block comprising a plurality of fluoroether functionalized alkylene arylate repeat units adjacent to one another; said non-fluorinated alkylene arylate repeat unit represented by Structure I

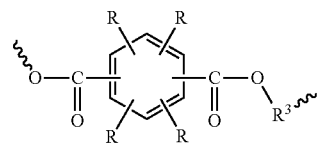

wherein each R is independently H or C$_1$-C$_{10}$ alkyl, and R$^3$ is C$_2$-C$_4$ alkylene which can be branched or unbranched; and, said fluoroether functionalized repeat units are represented by Structure II,

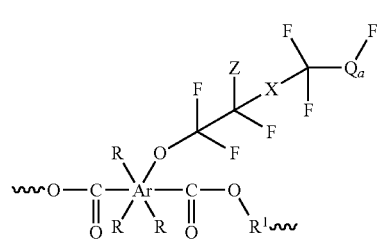

wherein, Ar represents a benzene or naphthalene radical; each R is independently H, C$_1$-C$_{10}$ alkyl, C$_5$-C$_{15}$ aryl, C$_6$-C$_{20}$ arylalkyl; OH, or a radical represented by the Structure (III)

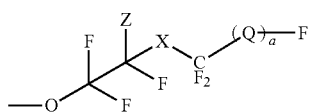

with the proviso that only one R can be OH or the radical represented by the Structure (III); $R^1$ is a $C_2$-$C_4$ alkylene radical which can be branched or unbranched, X is O or $CF_2$; Z is H, Cl, or Br; a=0 or 1;
and,
Q represents the Structure (IIa)

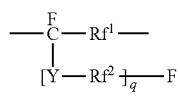

wherein q=0-10; Y is O or $CF_2$; $Rf^1$ is $(CF_2)_n$, wherein n is 0-10; and, $Rf^2$ is $(CF_2)_p$, wherein p is 0-10, with the proviso that when p is 0, Y is $CF_2$.

At concentrations of the block copolymer in the blend less than 0.1 weight-% (wt-%) no significant beneficial effect is achieved. At concentrations of the block copolymer in the blend greater than 10 wt-%, the desirable properties of the poly(alkylene arylate) are suppressed, and poor fluorine efficiency results.

In one embodiment, the poly(alkylene arylate) is a poly (alkylene terephthalate). Suitable poly(alkylene terephthalates) include, but are not limited to, poly(ethylene terephthalate), poly(trimethylene terephthalate), poly(tetramethylene terephthalate), or poly(ethylene napthalate). In one embodiment, the poly(alkylene terephthalate) is poly(trimethylene terephthalate)

In one embodiment, poly(trimethylene terephthalate) has an IV of 0.85 to 1.1 dL/g. The poly(trimethylene terephthalate) (PTT) having an IV of 0.85 to 1.1 dL/g encompasses homopolymers and copolymers containing at least 70 mole % trimethylene terephthalate repeat units. The preferred PTT contains at least 85 mole %, more preferably at least 90 mole %, even more preferably at least 95 or at least 98 mole %, and most preferably about 100 mole %, trimethylene terephthalate repeat units.

The poly(trimethylene terephthalate) can contain minor amounts of other comonomers, and such comonomers are usually selected so that they do not have a significant adverse effect on properties. Such other comonomers include 5-sodium-sulfoisophthalate, for example, at a level in the range of about 0.2 to 5 mole %. Very small amounts of trifunctional comonomers, for example trimellitic acid, can be incorporated for viscosity control.

In one embodiment of the copolymer, the mole ratio of non-fluorinated repeat units to fluoroether functionalized repeat units is in the range of 9 to 0.25. In a further embodiment, the mole ratio is in the range of 1.5 to 0.67.

The blend hereto is prepared in a high shear melt mixing process. Any high shear melt mixing process normally employed in the art to prepare polymer blends is suitable This includes use of twin-screw extruders, Farrel continuous mixers, Brabender and Banbury batch mixers, and the like. In a suitable process, the components are weight loss fed to the feed zone of a twin-screw extruder in which they are melted and aggressively mixed, followed by extrusion into strands that, after quenching, are cut into blend pellets suitable for use in a wide variety of polymer processes.

Alternatively, the melt blend can be fed directly to a metering pump and thence to a spin head for direct melt spinning into melt blend fibers.

The blend is suitable also for the production of extruded films and sheets; and of molded parts such as by compression or injection molding.

The invention is further described and enabled in the following specific embodiments, but is not limited in scope thereto.

EXAMPLES

Materials

Purchased from Aldrich Chemical Company, and Used as Received, were dimethyl terephthalate (DMT)
dimethyl isophthalate (DMI)
titanium(IV) isopropoxide
ethylene glycol
1,4-butanediol
tetrahydrofuran (THF)
dimethyl 5-hydroxyisophthalate
potassium carbonate
Obtained from the Dupont Company and Used as Received, Unless Otherwise Noted.
Bio-based 1,3-propanediol (Bio-PDO™) 1,1,1,2,2,3,3-heptafluoro-3-(1,2,2-trifluorovinyloxy) propane (PPVE)
Sorona® Poly(trimethylene terephthalate) (PTT), bright 1.02 IV
Purchased from SynQuest Labs, and Used as Received
1,1,1,2,2,3,3-heptafluoro-3-(1,1,1,2,3,3-hexafluoro-3-(1,2,2-trifluorovinyloxy)propan-2-yloxy)propane (PPPVE)

Testing Methods

Surface Analysis

Surface contact angles of hexadecane on polymer film were recorded on a. Ramé-Hart Model 100-25-A goniometer (Ramé-Hart Instrument Co) with an integrated DROPimage Advanced v2.3 software system. 4 μL of hexadecane was dispensed using a micro syringe dispensing system.
Molecular Weight by Size Exclusion Chromatography A size exclusion chromatography system Alliance 2695™ from Waters Corporation (Milford, Mass.), was provided with a Waters 414™ differential refractive index detector, a multiangle light scattering photometer DAWN Heleos II (Wyatt Technologies, Santa Barbara, Calif.), and a ViscoStar™ differential capillary viscometer detector (Wyatt). The software for data acquisition and reduction was Astra® version 5.4 by Wyatt. The columns used were two Shodex GPC HFIP-806M™ styrene-divinyl benzene columns with an exclusion limit of $2 \times 10^7$ and 8,000/30 cm theoretical plates; and one Shodex GPC HFIP-804M™ styrene-divinyl benzene column with an exclusion limit $2 \times 10^5$ and 10,000/30 cm theoretical plates.

The specimen was dissolved in 1,1,1,3,3,3-hexafluoro-2-propanol (HFIP) containing 0.01 M sodium trifluoroacetate by mixing at 50° C. with moderate agitation for four hours followed by filtration through a 0.45 μm PTFE filter. Concentration of the solution was circa 2 mg/mL.

Data was taken with the chromatograph set at 35° C., with a flow rate of 0.5 ml/min. The injection volume was 100 μl. The run time was 80 min. Data reduction was performed incorporating data from all three detectors described above. 8 scattering angles were employed with the light scattering detector. No standard for column calibration was involved in the data processing Thermal Analysis Glass transition temperature ($T_g$) and melting point ($T_m$) were determined by differential scanning calorimetry (DSC) performed according to ASTM D3418-08.

NMR Analysis $^{13}C$ NMR data was acquired on a 700 MHz NMR, using a 10 mm probe:

In a first determination, a 310 mg polymer specimen and 30 mg of chromium acetyl acetonate (CrAcAc) were dissolved in deuterated 1,1,2,2 tetrachloroethylene (TCE-d2) to 3.1 ml total volume with minimal heating. NMR spectra were acquired using an acquisition time of 1 sec, 90 degree pulse of about 11 μsec, spectral width of 44.6 kHz, recycle delay of 5 sec, temperature of 120° C., 2500-4500 transients averaged. Data processed typically with exponential line broadening of 0.5-2 hz and zero fill of 512 k. Spectra were referenced to TCE-d2 carbon at 74.2 ppm.

In a second determination, a 310 mg polymer specimen and 30 mg of CrAcAc were dissolved in deuterated 1,1,1,3,3,3-hexafluoro-2-propanol-d2 (TCE-d2) to about 2.4 ml total volume with a dmso-d6 capillary insert for lock. NMR spectra were acquired using acquisition time of 0.64 or 1 sec, 90 degree pulse of =11 μsec, spectral width of 44.6 kHz, recycle delay of 5 sec, temperature at 25° C. and 2500-4500 transients averaged. Data processed with lb of typically 0.5-2 Hz and zero fill of 512 k. Spectra were referenced to DMSO-d6 carbon at 39.5 ppm.

Note Regarding Reactions

In the following examples, when it is stated that the temperature was raised to some temperature, and the reaction vessel held for some period of time, it shall be understood that in all cases, unless specifically noted to have otherwise been the case, the procedure followed was to increase the set point of the heat bath to the stated temperature, allow the heat bath to achieve the set-point temperature, and then to hold the reaction vessel for the indicated period of time after the heat bath had come to the set point temperature.

It shall further be understood that stirring at the last stated speed was maintained throughout all steps in the reactions described, unless expressly stated otherwise.

Example 1 and Comparative Example A (CE A)

Copolymer from oligomers of 3-GT and 3-GF$_{16}$-iso, long polycondensation time A. Synthesis of (dimethyl 5-(1,1,2-trifluoro-2-(1,1,2,3,3,3-hexafluoro-2-(perfluoropropoxy)propoxy)ethoxy)isophthalate (F$_{16}$-iso)

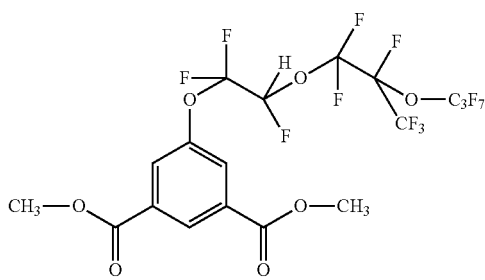

Anhydrous THF (12 liters) and dimethyl 5-hydroxy-isophthalate (2100 g) were combined under nitrogen in an oil jacketed 22 liter RB flask equipped with a condenser, mechanical stirrer, pressure equalizing addition funnel. To this stirred solution was added anhydrous potassium carbonate (345 g), followed by 1,1,1,2,2,3,3-heptafluoro-3-(1,1,1,2,3,3-hexafluoro-3-(1,2,2-trifluorovinyloxy)propan-2-yloxy) propane (4750 g). Ca. 2 liters of additional THF was used to wash all the reagents into the reaction vessel. The resulting mixture was refluxed for 12.0 hours.

Next day, the cool reaction mixture was filtered, to remove the potassium carbonate and the resulting solution concentrated via rot-evaporation. The resulting material was fractional vacuum distilled to give three fractions:

| Fraction | Wt. (g) | NMR Analysis |
|---|---|---|
| 1 | 130 | THF and Product |
| 2 | 2714 | Product |
| 3. | 2503 | Product |

Recovered heel: 897 g.

Proton NMR of the reaction at this stage showed almost complete conversion to the desired material. $^1H$ NMR (CDCl3, ppm))=8.56 (s, 1H, Ar—H), 7.95 (s, 2H, Ar—H), 6.05 (d, 1H, CF2-CFH—O), 3.89 (s, 6H, COO—CH3)

B. Preparation of 3-GF$_{16}$-iso homopolymer from F$_{16}$-iso and 1,3-propanediol 150 g of the F$_{16}$-iso prepared in Example 1 Section A and 32 g of 1,3-propanediol were charged to an oven-dried 500 mL three necked round bottom flask equipped with an overhead stirrer and a distillation condenser. The reactants were stirred under a nitrogen purge at a speed of 50 rpm while the condenser was kept at 23° C. The contents were degassed three times by evacuating down to a pressure of 100 Torr and refilling back to atmospheric pressure with N$_2$ gas. Tyzor®TPT catalyst (45 mg) was added after the first evacuation. The flask was immersed into a preheated metal bath after the three degassing/repressurization cycles set at 210° C. and held for 90 minutes while stirring speed was increased from 50 to 180 rpm. Following the 90 minute hold, the nitrogen purge was discontinued and a vacuum ramp was started such that after about 60 minutes the vacuum reached a value of 50-60 mTorr. The reaction was held under vacuum at 50-60 mTorr for an additional 60 minutes with stirring at 180 rpm. The reaction vessel was then removed from the heat source. The over-head stirrer was stopped and elevated from the floor of the reaction vessel. The vacuum was then turned off and the system was purged with N$_2$ gas at atmospheric pressure. The thus formed product mixture was allowed to cool to ambient temperature. The product was recovered after carefully breaking the glass with a hammer. Yield=88%.

$^1$H-NMR (CDCl$_3$) δ: 8.60 (ArH, s, 1H), 8.00 (ArH—, s, 2H), 7.70 (ArH, s, 4H), 6.15 (—CF$_2$—CFH—O—, d, 1H), 4.70-4.50 (COO—CH$_2$—, m, 4H), 3.95 (—CH$_2$—OH, t, 2H), 3.85 (—CH$_2$—O—CH$_2$—, t, 4H), 2.45-2.30 (—CH$_2$—, m, 2H), 2.10 (—CH$_2$—CH$_2$—O—CH$_2$—CH$_2$—, m, 4H).

Thermal data: T$_g$=5° C. No melting point was observed. M$_n$=9.1×10$^3$ Da, M$_w$=16.6×10$^3$ Da C. Preparation of 3-GT Homopolymer of Dimethylterephthalate and 1,3-propanediol Dimethylterephthalate (150 g), and 1,3-propanediol (105.9 g) were charged to an oven-dried 500 mL three necked round bottom flask equipped with an overhead stirrer and a distillation condenser. The reactants were stirred under a nitrogen purge at a speed of 10 rpm while the condenser was kept at 23° C. The contents of the flask were degassed three times by evacuating down to 500 mTorr and refilling back to atmospheric pressure with $N_2$ gas. Tyzor®TPT catalyst (94 mg) was added after the first evacuation. Following the three degassing cycles, the flask was immersed into a preheated metal bath set at 160° C. The solids were allowed to completely melt at 160° C. for 20 minutes while the stirring speed was slowly increased to 180 rpm. The temperature was increased to 210° C. and was held at 210° C. for 90 minutes. After 90 minutes at 210° C., the temperature was increased to 250° C. after which the nitrogen purge was discontinued, and a vacuum ramp was started such that after about 60 minutes the vacuum reached a value of about 60 mTorr. After an additional 30 minutes at 250° C. and 60 mTorr, the heat source was removed. The over-head stirrer was stopped and elevated from the floor of the reaction vessel. The vacuum was then turned off and the system purged with $N_2$ gas at atmospheric pressure. The thus formed product was allowed to cool to ambient temperature. The product was recovered after carefully breaking the glass with a hammer. Yield=85% of 3GT polymer.

$^1$H-NMR (CDCl$_3$/TFA-d): δ 8.25-7.90 (ArH—, m, backbone), 7.65 (ArH, s, cyclic dimer), 4.75-4.45 (COO—CH$_2$—, m, backbone), 3.97 (HO—CH$_2$—R, t-broad, end group), 3.82 (—CH$_2$—O—CH$_2$—, t, backbone DPG), 2.45-2.05 (—CH$_2$—, m, backbone).

Thermal data: $T_g$=55° C., $T_m$=230° C. $M_n$=8.5×10$^3$ Da, $M_w$=16.1×10$^3$ Da.

D. Preparation of 3-GF$_{16}$-iso-co-3-GT copolymer 15.3 g of the 3-GT prepared in Example 1 Section C and 46 g of the 3-GF$_{16}$-iso prepared in Example 1 Section B were charged to an oven-dried 250 mL three necked round bottom flask equipped with an overhead stirrer and a distillation condenser kept at 23° C. The contents of the flask were degassed once by evacuating down to 150 mTorr and refilling back to atmospheric pressure with $N_2$ gas. Tyzor®TPT catalyst (18 mg) was added after the evacuation and repressurization. The nitrogen purge was then discontinued, and a vacuum ramp was started such that after about 30 minutes the vacuum reached a value of about 60 mTorr. The flask was then immersed into a preheated metal bath set at 250° C., and the contents of the flask were allowed to melt and equilibrate for 10 minutes. Stirring was initiated and slowly increased to 180 rpm, and the molten contents of the flask were held under stirring for 3 hours in the 250° C. bath. After 3 hours at 250° C., 60 mTorr, and stirring at 180 rpm, the heat source was removed. The over-head stirrer was stopped and elevated from the floor of the reaction vessel. The vacuum was then turned off, and the system was purged with $N_2$ gas at atmospheric pressure. The thus formed product was allowed to cool to ambient temperature. The product was recovered after carefully breaking the glass with a hammer.

Yield was approximately 90% of an opaque product designated 3-GF$_{16}$-iso-co-3-GT.

$^{13}$C-NMR (TCE-d2): δ 62.9 (E) 62.7 (D) 62.4 (G) 62.2 (F); B=0.8.

Thermal data: $T_{g1}$=18° C., $T_{g2}$=54° C., $T_m$=219° C. $M_n$=59.0×10$^3$ Da, $M_w$=118.5×10$^3$ Da.

CE-A. Copolymerization of Dimethylterephthalate, F$_{16}$-iso, and 1,3-propanediol Dimethylterephthalate (30.1 g), F$_{16}$-iso (100 g), and 1,3-propanediol (42.6 g) were charged to an oven-dried 500 mL three necked round bottom flask equipped with an overhead stirrer and a distillation condenser kept at 23° C. The reactants were stirred under a nitrogen purge at a speed of 50 rpm. The contents were degassed three times by evacuating down to 100 Torr and refilling back to atmospheric pressure with $N_2$ gas. Tyzor®TPT catalyst [40 mg] was added after the first evacuation. The flask was immersed into a preheated metal bath set at 160° C. The solids were allowed to completely melt at 160° C. for minutes after which the stirring speed was slowly increased to 180 rpm. The temperature was increased to 210° C. and maintained for 90 minutes. After 90 minutes at 210° C., the nitrogen purge was discontinued, and a vacuum ramp was started such that after an additional 60 minutes the vacuum reached 50-60 mTorr. The reaction was held under stirring 180 rpm for 3 hours still at 210° C. after which the reaction vessel was removed from the heat source. The over-head stirrer was stopped and elevated from the floor of the reaction vessel. The vacuum was then turned off and the system purged with $N_2$ gas at atmospheric pressure. The thus formed product was allowed to cool to ambient temperature. The product was recovered after carefully breaking the glass with a hammer. Yield=90% of a clear product.

$^1$H-NMR (CDCl$_3$) δ: 8.60 (ArH, s, 1H), 8.15-8.00 (ArH—, m, 2+4H), 7.65 (ArH, s, 4H), 6.15 (—CF$_2$—CFH—O—, d, 1H), 4.70-4.50 (COO—CH$_2$—, m, 4H), 3.95 (—CH$_2$—OH, t, 2H), 3.85 (—CH$_2$—O—CH$_2$—, t, 4H), 2.45-2.30 (—CH$_2$—, m, 2H), 2.10 (—CH$_2$—CH$_2$—O—CH$_2$—CH$_2$—, m, 4H).

$^{13}$C-NMR (CDCl$_3$) δ: 62.6 62.4 62.1 62.0; B=1.

Thermal data: $T_g$=23° C. Only one $T_g$ was observed. No melting point was observed. $M_n$=12.6×10$^3$ Da, $M_w$=24×10$^3$ Da.

Example 2

Copolymer from Oligomers of 3-GT and 3-GF$_{16}$-iso, Short Polycondensation Time The materials produced in Example 1 Sections A, B, and C were employed as described in Example 2 Section D, infra.

D. Preparation of 3-GF$_{16}$-iso-co-3-GT Copolymer of 3-GF$_{16}$-iso and 3-GT 15.3 g of the 3-GT prepared in Example 1 Section C, supra, and 46 g of the 3-GF$_{16}$-iso prepared in Example 1 Section B, supra, were charged to an oven-dried 250 mL three necked round bottom flask equipped with an over-head stirrer and a distillation condenser kept at 23° C. The reaction mass was kept under nitrogen purge. The contents were degassed once by evacuating down to 150 mTorr and refilling back to atmospheric pressure with $N_2$ gas. Tyzor®TPT catalyst (18 mg) was added after the evacuation and repressurization. The nitrogen purge was then discontinued, and a vacuum ramp was started such that after about 30 minutes the vacuum reached a value of about 60 mTorr. The flask was then immersed into a preheated metal bath set at 250° C., and the contents of the flask were allowed to melt and equilibrate for 10 minutes. Stirring was initiated and the speed was slowly increased to 180 rpm, and the molten contents of the flask was left under stirring for 60 minutes in the 250° C. bath. The heat source was then removed. The over-head stirrer was stopped and elevated from the floor of the reaction vessel. The vacuum was then turned off, and the system purged with $N_2$ gas. The thus formed product was allowed to cool to ambient temperature. The product was recovered after carefully breaking the glass with a hammer. Yield=95.7% of an opaque product.

$^{13}$C-NMR (TCE-d2) δ 62.9 (E) 62.7 (D) 62.4 (G) 62.2 (F); B=0.63.

Thermal data: $T_{g1}$=16.8° C., $T_{g2}$=51° C., $T_m$=222.5° C. $M_n$=31.7×10$^3$ Da, $M_w$=65×10$^3$ Da.

Example 3

Copolymer from 3-GT and 3-GF$_{16}$-iso Oligomer

The oligomeric 3-GF$_{16}$-iso prepared in Example 1 Section B was employed in Example 3 Section C, infra.

C. Preparation of 3-GF$_{16}$-iso-co-3-GT copolymer of 3-GF$_{16}$-iso and 3-GT The procedures of Example 1 Section D were replicated except that 15.3 g of Sorona® Bright poly(trimethylene terephthalate) resin (1.02 I.V. available from The Dupont Company, Wilmington, Del.) were substituted for the 3-GT oligomer prepared in Example 1 Section C, and the reaction vessel was held at 250° C. for 90 minutes rather than 3 hours. Yield=82.6% of an opaque product.

$^{13}$C-NMR (TCE-d2) δ 62.9 (E) 62.7 (D) 62.4 (G) 62.2 (F); B=0.56.

Thermal data: $T_{g1}$=17° C., $T_{g2}$=56.1° C., $T_m$=220.1° C. $M_n$=100.6×10$^3$ Da, $M_w$=199.6×10$^3$ Da.

Example 4 and Comparative Example B (CE B)

A. Synthesis of Dimethyl 5-(1,1,2-trifluoro-2-(perfluoropropoxy)ethoxy)isophthalate (F$_{10}$-iso):I

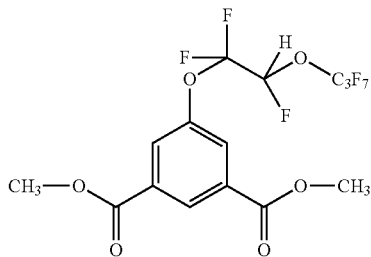

Anhydrous THF (12 liters) and dimethyl 5-hydroxy-isophthalate (2100 g) were combined under nitrogen in an oil jacketed 22 liter RB flask equipped with a condenser, mechanical stirrer, pressure equalizing addition funnel. To this stirred solution was added anhydrous potassium carbonate (1035 g), followed by 1,1,1,2,2,3,3-heptafluoro-3-(1,2,2-trifluorovinyloxy)propane (3192 g). Ca. 2 liters of additional THF was used to wash all the reagents into the reaction vessel. The resulting mixture was refluxed for 10.5 hours.

Next day, the cool reaction mixture was filtered, to remove the potassium carbonate and the resulting solution concentrated via rot-evaporation. The resulting material was fractional vacuum distilled to give three fractions:

| Fraction | Wt. (g) | NMR Analysis |
|---|---|---|
| 1 | 102 | Mixture of Product and THF |
| 2 | 2526 | Product. |
| 3 | 1167 | Product |

Recovered Heel: 676 g

Proton NMR of the reaction at this stage showed complete conversion to the desired material. 1H NMR (CDCl3, ppm))=8.54 (s, 1H, Ar—H), 7.97 (s, 2H, Ar—H), 6.07 (d, 1H, CF2-CFH—O), 3.89 (s, 6H, COO—CH3)

B. Preparation of homopolymer (3-GF$_{10}$-iso)

150 g of the F$_{10}$-iso prepared in Example 4 Section A, supra, and 43.1 g of 1,3-propanediol were charged to an oven-dried 500 mL three necked round bottom flask equipped with an overhead stirrer and a distillation condenser kept at 23° C. The reactants were stirred under a nitrogen purge at a speed of 50 rpm. The contents were degassed three times by evacuating down to 100 Torr and refilling back to atmospheric pressure with N$_2$ gas. Tyzor®TPT catalyst (45 mg) was added after the first evacuation. The flask was then immersed into a preheated metal bath set at 160° C. and held for 20 minutes while slowly increasing the stirring speed to 180 rpm after which the temperature was increased to 210° C. and the reaction flask was held for an additional 90 minutes still at 180 rpm. Following the 90 minute hold, the nitrogen purge was discontinued and a vacuum ramp was started such that after about 60 minutes the vacuum reached a value of 50-60 mTorr. The reaction was held for an additional 90 minutes with stirring at 180 rpm. The heat source was then removed. The over-head stirrer was then stopped and elevated from the floor of the reaction vessel. The vacuum was then turned off, and the system was purged with N$_2$ gas. The thus formed product was allowed to cool to ambient temperature. The product was recovered after carefully breaking the glass with a hammer. Yield=82.6%.

$^1$H-NMR (CDCl$_3$) δ: 8.60 (ArH, s, 1H), 8.00 (ArH—, s, 2H), 7.70 (ArH, s, 4H), 6.15 (—CF$_2$—CFH—O—, d, 1H), 4.70-4.50 (COO—CH$_2$—, m, 4H), 3.95 (—CH$_2$—OH, t, 2H), 3.85 (—CH$_2$—O—CH$_2$—, t, 4H), 2.45-2.30 (—CH$_2$—, m, 2H), 2.10 (—CH$_2$—CH$_2$—O—CH$_2$—CH$_2$—, m, 4H).

Thermal data: $T_g$=22.6° C. No melting point was observed. $M_n$=17.1×10$^3$ Da, $M_w$=21.2×10$^3$ Da.

C. Preparation of 3-GF$_{10}$-iso-co-3-GT copolymer of 3-GF$_1$-iso and 3-GT

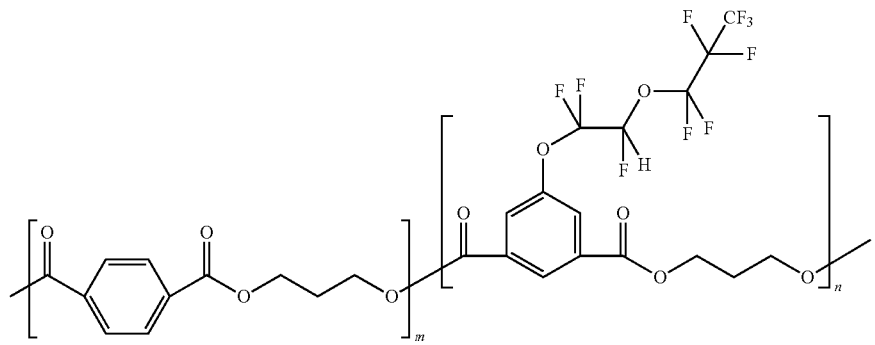

20 g of the 3-GT polymer prepared in Example 1 Section C and 46 g of the 3-GF$_{10}$-iso prepared in Example 4 Section B were charged to an oven-dried 250 mL three necked round bottom flask equipped with an overhead stirrer and a distillation condenser kept at 23° C. The reaction mass was kept under N$_2$ purge atmosphere. The contents were degassed once by evacuating the reaction flask down to 150 mTorr and refilling back to atmospheric pressure with N$_2$ gas. Tyzor®TPT catalyst (20 mg) was added after the evacuation and repressurization. The nitrogen purge was then discontinued, and a vacuum ramp was started such that after about 30 minutes the vacuum reached a value of about 60 mTorr. The reaction flask was then immersed into a preheated metal bath set at 250° C. and the contents of the reaction flask were allowed to melt and equilibrate for 10 minutes. Stirring was initiated and speed was slowly increased to 180 rpm. The thus formed melt was left under vacuum with stirring for 15 minutes. The heat source was then removed. The over-head stirrer was then stopped and elevated from the floor of the reaction vessel. The vacuum was turned off, and the system was purged with N$_2$ gas. The thus formed product was allowed to cool to ambient temperature. The product was recovered after carefully breaking the glass with a hammer. Yield 91.2% of turbid product.

$^{13}$C-NMR (TCE-d2) δ 62.9 (E) 62.7 (D) 62.4 (G) 62.2 (F); B=0.56.

Thermal data: $T_{g1}$=28.1° C., $T_{g2}$=51.8° C., $T_m$=216° C. $M_n$=40.6×10$^3$ Da, $M_w$=64.3×10$^3$ Da.

CE-B. Copolymer of Dimethylterephthalate, F$_{10}$-iso, and 1,3-propanediol 12.2 g of dimethylterephtalate, 30 g of the F$_{10}$-iso prepared in Example 4 Section A, supra, and 17.25 g of 1,3-propanediol were charged to an oven-dried 500 mL three necked round bottom flask equipped with an overhead stirrer and a distillation condenser kept at 23° C. The reactants were stirred under a nitrogen purge at a speed of 50 rpm. The contents were degassed three times by evacuating down to 100 Torr and refilling back to atmospheric pressure with N$_2$ gas. Tyzor®TPT catalyst (13 mg) was added after the first evacuation. The reaction flask was immersed into a preheated metal bath set at 160° C. The solids were allowed to completely melt at 160° C. for 20 minutes, after which the stirring speed was slowly increased to 180 rpm. The temperature was increased to 210° C. and maintained for 60 minutes. After 60 minutes, the nitrogen purge was discontinued, and a vacuum ramp was started such that after an additional 60 minutes the vacuum reached 50-60 mTorr. As the vacuum stabilized, the stirring speed was increased to 225 rpm and the reaction held for 3 hours. The heat source was then removed. The over-head stirrer was stopped and elevated from the floor of the reaction vessel. The vacuum was then turned off and the system was purged with N$_2$ gas at atmospheric pressure. The thus formed product was allowed to cool to ambient temperature. The product was recovered after carefully breaking the glass with a hammer. Yield=90% of clear product.

$^1$H-NMR (CDCl$_3$) δ: 8.60 (ArH, s, 1H), 8.15-8.00 (ArH—, m, 2+4H), 7.65 (ArH, s, 4H), 6.15 (—CF$_2$—CFH—O—, d, 1H), 4.70-4.50 (COO—CH$_2$—, m, 4H), 3.95 (—CH$_2$—OH, t, 2H), 3.85 (—CH$_2$—O—CH$_2$—, t, 4H), 2.45-2.30 (—CH$_2$—, m, 2H), 2.10 (—CH$_2$—CH$_2$—O—CH$_2$—CH$_2$—, m, 4H).

$^{13}$C-NMR (CDCl$_3$) δ: 62.6 62.4 62.1 62.0; B=1.

Thermal data: $T_g$=34° C. Only one $T_g$ was observed. No melting point was observed. $M_n$=129.7×10$^3$ Da, $M_w$=212×10$^3$ Da.

Example 5

Copolymer from Oligomers of 4-GT and 3-GF$_{16}$-iso

The 3-GF$_{16}$-iso prepared in Example 1 Section B was employed herein.

C. Preparation of Homopolymer of Dimethylterephthalate and 1,4-Butanediol (4-GT)

Example 1 Section C was repeated except that 129.4 g of dimethylterephthalate instead of 150 g thereof, 118.9 g of 1,4-butanediol were used in place of the 105.9 g of 1,3-propanediol, and 165 mg of Tyzor® TPT were used instead of the 94 mg thereof employed in Example 1.

Yield=79%. $^1$H-NMR (CDCl$_3$/TFA-d): δ 8.25-7.95 (ArH—, m, backbone), 4.70-4.30 (COO—CH$_2$—, m, backbone), 2.20-1.80 (—CH$_2$—, m, backbone). Thermal data: $T_g$=42.4° C., $T_m$=223° C. $M_n$=10.9×10$^3$ Da, $M_w$=19.2×10$^3$ Da.

D. Preparation of Copolymer (3-GF$_{16}$-iso-co-4-GT)

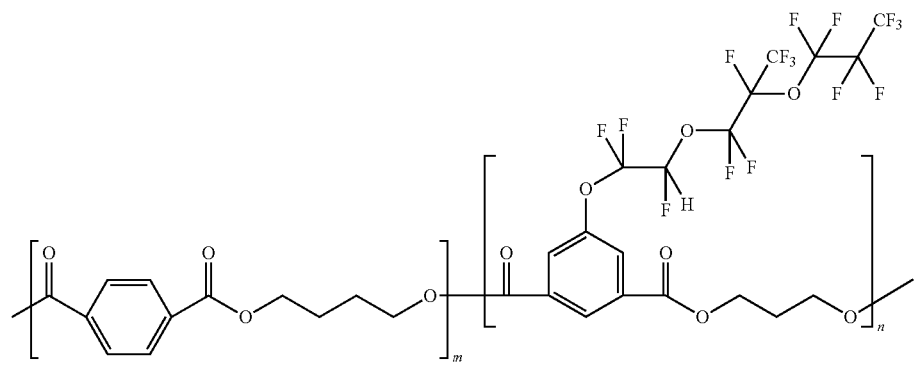

Example 1 Section D was repeated except that 20 g of the 4-GT homopolymer prepared in Example 5 Section C were substituted for the 15.3 g of 3-GT in Example 1, 59.4 g of the 3-GF$_{16}$-iso prepared in Example 1 Section B were used instead of the 46 g used in Example 1 Section D, 23 mg of Tyzor® TPT was used instead of the 18 mg used in Example 1 Section D, and the reaction vessel was held for 2 hours at 250° C. instead of 3 hours as in Example 1 Section D.

Yield=91.9% of an opaque product.

$^{13}$C-NMR (TCE-d2): δ 62.8 (E) 62.6 (D) 62.6 (G) 62.4 (F); B=0.65.

Thermal data: $T_{g1}$=11.1° C., $T_{g2}$=47.2° C., $T_m$=206.8° C. $M_n$=86.6×10$^3$ Da, $M_w$=208.6×10$^3$ Da.

Example 6

Copolymer from Oligomers of 2-GT and 3-GF$_6$-iso

The 3-GF$_{16}$-iso prepared in Example 1 Section B was employed herein.

C. Preparation of Copolymer of Dimethylterephthalate, Dimethylisophthalate and Ethyleneglycol (2-GT)

Example 1 Section C was repeated except that: a combination of 145.5 g of dimethylterephthalate and 3.9 g of dimethylisophthalate were used in place of the 150 g of dimethylterephthalate; 95.6 g of 1,2-ethanediol were used in place of the 105.9 g of 1,3-propanediol; and, the metal bath was set to 260° C. instead of 250° C. Yield=55%.

$^1$H-NMR (CDCl$_3$/TFA-d): δ 8.60 (ArH, s, 1H), 8.25-7.95 (ArH—, m, backbone), 4.80-4.45 (COO—CH$_2$—, m, backbone).

Thermal data: $T_g$=81.5° C., $T_m$=248.9° C. $M_n$=14.1×10$^3$ Da, $M_w$=27.1×10$^3$ Da.

D. Preparation of Copolymer 3-GF$_{16}$-iso-co-2-GT

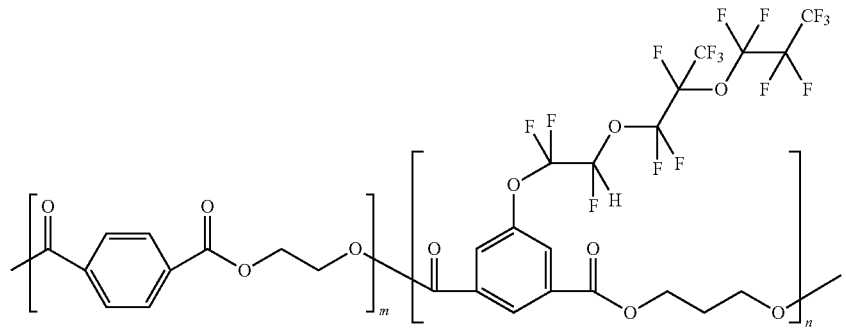

Example 1 Section D was repeated except that 20 g of the 2-GT polymer prepared in Example 6 Section C was substituted for the 15.3 g of the 3-GT in Example 1 Section D, 68 g of the 3-GF$_{16}$-iso was used in place of the 46 g thereof in Example 1 Section D, 26 mg of Tyzor® TPT was added instead of 18 mg thereof, the bath temperature was 270° C. instead of 250° C. as in Example 1 Section D, and the reaction time was 2 hours at 270° C., 60 mTorr, with stirring at 180 rpm instead of 3 hours at 250° C. with stirring at 180 rpm as in Example 1 Section D. Yield=93% of an opaque product.

$^{13}$C-NMR (TCE-d2): δ 63.4 (E) 63.2 (D) 62.6 (G) 62.4 (F); B=0.61.

Thermal data: $T_{g1}$=15.5° C., $T_{g2}$=77.3° C., $T_m$=217.9° C. $M_n$=76.6×10$^3$ Da, $M_w$=215.4×10$^3$ Da.

Examples 7-9 and Comparative Examples C-E

The 3-GF$_{16}$-iso-co-3-GT copolymer of Example 1 and the copolymer of CE-A were separately chopped into one inch sized pieces that were placed in liquid nitrogen for 5-10 minutes, followed by charging to a Wiley mill fitted with a 6 mm screen. Each sample was milled at ca. 1000 rpm to produce coarse particles having a maximum dimension of about ⅛". The particles were dried under vacuum and allowed to warm to ambient temperature.

The two batches of particles were dried overnight in a vacuum oven at ambient temperature under a slight nitrogen purge. Sorona® Bright (1.02 dl/g IV) poly(trimethylene terephthalate) (PTT) pellets available from the DuPont Company were dried overnight in a vacuum oven at 120° C. under a slight nitrogen purge. Blends of each of the copolymers with the Sorona® were prepared in a DSM microcompounder at 1, 2.5, and 5% by weight of the particles with respect to the total weight of the blends. The DSM system is a PC controlled 15 cubic centimeter (cc), co-rotating, intermeshing (self wiping), 2-tipped, conical twin-screw machine with a recirculation loop, discharge valve, nitrogen purge system, and with three different heating zones. 250° C. was used for all three heat zones. Polymer melt temperature was in the range of 230-235° C. Under nitrogen Sorona® and the respective copolymer were charged and stirred at a speed of 150 rpm for a total mixing time of 5 minutes. Following the mixing time, the discharge valve was opened and an extruded one inch wide, 0.015 inch thick, 10 foot long sheet collected. Advancing and receding surface contact angles of hexadecane were determined as described supra. Results are shown in Table 1 below. Also shown in Table 1 is the contact angle for an unblended film of Sorona® Bright PTT.

TABLE 1

| Example | Copolymer Concentration (Wt-%) | Hexadecane Contact Angle (deg.) | |
|---|---|---|---|
| | | Advancing | Receding |
| 7 | 1 | 46.3 | 37.0 |
| 8 | 2.5 | 61.6 | 40.9 |
| 9 | 5 | 68.5 | 42.2 |
| CE-C | 1 | 39.0 | 23.0 |
| CE-D | 2.5 | 54.7 | 33.6 |
| CE-E | 5 | 66.0 | 43.4 |
| Sorona ® Bright | 0 | <10 (fully wetted) | |

Examples 8 and 9; Comparative Examples C and D

A. Milling

Additional ⅛" particles were prepared of the 3-GF₁₆-iso-co-3-GT copolymer prepared in Example 1 Section D by following the procedures described in Example 7 Section A.

B. Preparation of a Polymer Blend

Sorona® Bright (1.02 dl/g IV) poly(trimethylene terephthalate) (PTT) pellets available from the DuPont Company were dried overnight in a vacuum oven at 120° C. under a slight nitrogen purge. The 3-GF₁₆-iso-co-3-GT copolymer particles prepared in Example 1 Section D above were dried overnight in a vacuum oven at ambient temperature under a slight nitrogen purge. Prior to melt compounding the thus dried particles of 3-GF₁₆-iso-co-3-GT and pellets of Sorona® Bright were combined together to form a batch with a concentration of 2 wt-% of the 3-GF₁₆-iso-co-3-GT copolymer based upon the total weight of the blend. The thus combined particles and pellets were mixed in a plastic bag by shaking and tumbling by hand.

The thus mixed batch was placed into a K-Tron T-20 (K-Tron Process Group, Pittman, N.J.) weight loss feeder feeding a PRISM laboratory co-rotating twin screw extruder (available from Thermo Fisher Scientific, Inc.) equipped with a barrel having four heating zones and a diameter of 16 millimeter fitted with a twin spiral P1 screw. The extruder was fitted with a ⅛" diameter circular cross-Section single aperture strand die. The nominal polymer feed rate was 3-5 lbs/hr. The first barrel Section was set at 230° C. and the subsequent three barrel Sections and the die were set at 240° C. The screw speed was set at 200 rpm. The melt temperature of the extrudate was determined to be 260° C. by inserting a thermocouple probe into the melt as it exited the die. The thus extruded monofilament strand was quenched in a water bath. Air knives dewatered the strand before it was fed to a cutter that sliced the strand into about 2 mm length blend pellets.

C. Melt Spinning

Figure 3:
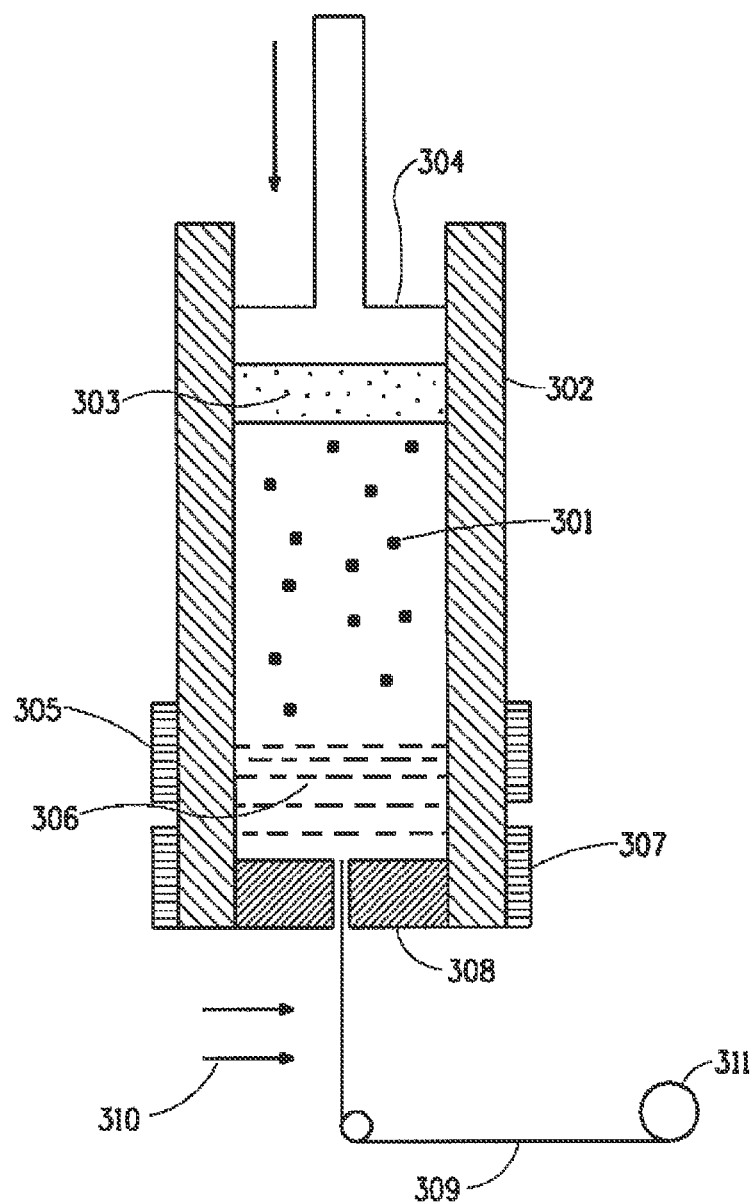
FIG. 3 is a schematic depiction of the fiber spinning apparatus employed in Example 8.

Referring to FIG. 3, the blended pellets of polymer thus made, 301, were charged to a steel cylinder, 302, and topped of with a Teflon® PTFE plug, 303. A hydraulically driven piston, 304, compressed the particles, 301, into a melting zone provided with a heater and heated to 260° C., 305, where a melt, 306, was formed, and the melt then forced into a separately heated, 307, round cross-Section single-hole spinneret (0.012 inches in diameter, 0.036 inches in length), 308, heated to 265° C. Prior to entering the spinneret, the polymer passed through a filter pack, not shown. The melt was extruded into a single strand of fiber, 309, at a rate of 0.8 g/min. The extruded fiber was passed through a transverse air quench zone, 310, and thence to a wind-up, 311. Two fiber samples were prepared, one at a wind-up speed of 700 m/min (Example 8) and one at a wind-up speed of 1430 m/min. Control fibers of Sorona® Bright were also spun under conditions identical to those of Examples 8 and 9 respectively (Comparative Examples C and D). In each case, the single filament strands were spun for 30 minutes, and in each case the filament spun smoothly without breaks. The resulting fiber in each case was flexible and strong as determined by pulling and twisting by hand.

We claim:

1. A polymer blend comprising a poly(alkylene arylate) and 0.1 to 10 weight percent based upon the total weight of the blend of a block copolymer having a blockiness index, B, in the range of 0.56 to 0.8, comprising a first block comprising a plurality of non-fluorinated alkylene arylate repeat units adjacent to one another; and a second block comprising a plurality of fluoroether functionalized alkylene arylate repeat units adjacent to one another; said non-fluorinated alkylene arylate repeat unit represented by Structure I

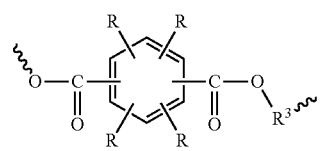

wherein each R is independently H or C1-C10 alkyl, and R3 is C2-C4 alkylene which can be branched or unbranched;

and, said fluoroether functionalized repeat units are represented by Structure II,

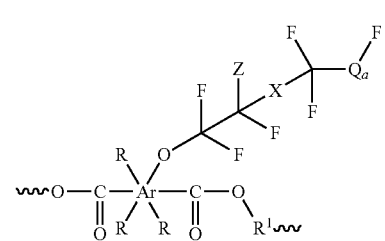

wherein, Ar represents a benzene or naphthalene radical; each R is independently H, $C_1$-$C_{10}$ alkyl, $C_5$-$C_{15}$ aryl, $C_6$-$C_{20}$ arylalkyl; OH, or a radical represented by the Structure (III)

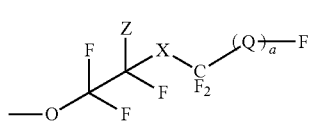

with the proviso that only one R can be OH or the radical represented by the Structure (III);

$R^1$ is a $C_2$-$C_4$ alkylene radical which can be branched or unbranched,

X is O or $CF_2$;

Z is H, Cl, or Br;

a=0 or 1;

and,

Q represents the Structure (IIa)

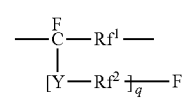

wherein q=0-10;

Y is O or $CF_2$;

$Rf^1$ is $(CF_2)_n$, wherein n is 0-10;

and, $Rf^2$ is $(CF_2)_p$, wherein p is 0-10, with the proviso that when p is 0, Y is $CF_2$.

2. The polymer blend of claim 1 wherein the poly(alkylene arylate) is poly(trimethylene terephthalate).

3. The polymer blend of claim 1 wherein the block copolymer $R^1$ is an ethylene radical.

4. The polymer blend of claim 1 wherein the block copolymer $R^1$ is a trimethylene radical, which can be branched.

5. The polymer blend of claim 1 wherein the block copolymer $R^1$ is a tetramethylene radical, which can be branched.

6. The polymer blend of claim 1 wherein the block copolymer each R is H.

7. The polymer blend of claim 1 wherein the block copolymer the fluoroether functionalized alkylene arylate repeat unit, Ar is a benzene radical, a=1, each R is H, Z is H, R1 is trimethylene, X is O, Y is O, $Rf^1$ is $CF_2$, and $Rf^2$ is $(CF_2)_3$, and q=1.

8. The polymer blend of claim 1 wherein the block copolymer the fluoroether functionalized alkylene arylate repeat unit is represented by the Structure (IVb)

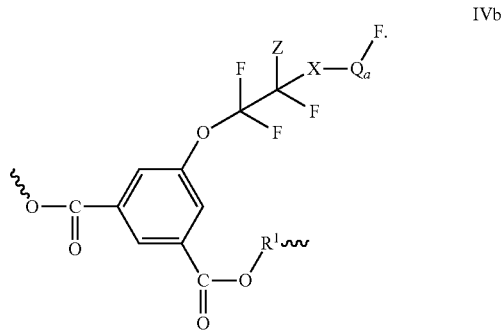

IVb

9. The polymer blend of claim 8 wherein a=1, Z is H, $R^1$ is trimethylene, X is O, Y is O, $Rf^1$ is $CF_2$, and $Rf^2$ is $(CF_2)_3$, and q=1.

10. The polymer blend of claim 1 wherein the block copolymer $R^3$ is trimethylene.

11. The polymer blend of claim 1 wherein the block copolymer the non-fluorinated repeat unit represented by Structure I is a trimethylene terephthalate diradical.

12. The polymer blend of claim 1 wherein the block copolymer is a multi-block copolymer.

13. The polymer blend of claim 1 wherein the block copolymer the non-fluorinated alkylene arylate repeat units and the fluoroether functionalized alkylene arylate repeat units are each present at a molar concentration, and wherein further, the mole ratio of non-fluorinated repeat units to fluoroether functionalized repeat units is in the range of 1.5 to 0.67.

* * * * *